No. 738,758. Patented September 15, 1903.

UNITED STATES PATENT OFFICE.

JOSÉ BAXERES DE ALZUGARAY, OF LONDON, ENGLAND, ASSIGNOR TO THE BAXERES GOLD EXTRACTION COMPANY, LIMITED, OF LONDON, ENGLAND.

EXTRACTION OF PRECIOUS METALS FROM THEIR ORES.

SPECIFICATION forming part of Letters Patent No. 738,758, dated September 15, 1903.

Application filed December 8, 1902. Serial No. 134,455. (No specimens.)

*To all whom it may concern:*

Be it known that I, JOSÉ BAXERES DE ALZUGARAY, a citizen of Argentina, and a resident of Suffolk House, Laurence Pountney Hill, in the city of London, England, have invented certain new and useful Improvements in or Relating to the Extraction of Precious Metals from Their Ores, of which the following is a specification.

This invention relates to the extraction of precious metals (particularly gold and silver) from their ores, the object of the invention being to entirely obviate the need for calcination even in the case of most refractory ores, to reduce the number of times the ore is handled, and to shorten the period of treatment, thus greatly simplifying the operation of extracting the precious metals.

To this end the invention consists in agitating the crushed ore in a solvent solution and blowing through it an oxidizing agent composed of a gaseous halogen compound and an acid compound diluted with oxygen in any convenient form. In carrying out the process the ore may be first moistened with water containing an alkali or alkali earthy oxid or other suitable alkali salt or compound. The solvent employed may be the well-known cyanid of potassium; but any other cyanid or cyanogen salt or cyanogen evolving or containing compound or mixtures may also be employed. Thus, for instance, ferrocyanid of potassium will be found very efficient for the purpose in view.

Of course no claim will be made for the use of cyanid as a solvent for gold and silver except in so far as it constitutes a part of a new process for extracting gold and silver from ores.

The oxidizing material consists of a gaseous halogen, such as bromin or chlorin or compounds of these two elements mixed together with their acids, such as hydrogen bromid and oxyacid compounds, such as bromic acid, and combined or diluted with a suitable volume of oxygen in a convenient form—say, for example, ozonized air—but oxygen, ozone, ozonized oxygen, steam, air, carbonic acid, or mixtures thereof may obviously be employed if and when suitable.

The mode of procedure will be as follows: The ore is crushed to any degree, coarse or fine—even to "sliming," if required—and is then mixed in a suitable vessel with water containing the cyanid in solution. This mixture is kept in a state of agitation in any convenient manner, and meanwhile the gaseous oxidizing material is blown through the liquid and ore in suspension.

Instead of blowing the gaseous oxidizing material alone through the ore and cyanid solution it may be mixed with the solvent in gaseous form, generated outside the dissolving vessel and blown through the mass of ore and liquid, which in this case will be simply water. The water may, however, contain a suitable amount of an alkali or alkali earthy oxid or other suitable alkali salt or compound under certain conditions which will be obvious.

The gaseous materials of bromin or chlorin, together with their acid and oxyacid compounds, dissolved in oxygen and its compounds, as used in connection with this process, do not act in the solution or mixture of ore and cyanid solution as cyanogen-carriers, as in the bromocyanid process, but as strong oxidizers, which have the effect of splitting the precious metals from their combinations with non-metallic or easily-oxidizable elements. The precious metals are thus set free to be readily converted into cyanids by the cyanid solution.

The proportion in which the bromin or chlorin vapor and its oxy compounds are mixed and then dissolved in the other oxidizing elements or materials may vary considerably, according to the circumstances. The intimate mixture of the bromin or chlorin with large amounts of ozonized gaseous materials or elements oxidizes them strongly, forming mixtures of the bromin or chlorin oxyacids. On account of the acidity of the oxidizing material it does not when it comes into contact with the cyanid solution produce or form bromocyanid, and this fact differentiates the present invention widely from the bromocyanid process. Evidence of the strongly-oxidizing properties of these reagents acting in conjunction with cyanids as solvents is in the case of pyritic ores shown by the yellow coloration of the liquor. This liquor after a few hours treatment (generally five) contains large quantities of potassium ferrocyanid and sulfocyanid, showing clearly to what extent the sulfids in the ore treated have been acted on or decomposed. The rate of extraction of gold depends on the decomposition of the non-metallic and oxidizable elements found in the ore, and the intensity of coloration affords a sure indication as to whether the treatment has been successful and what has been the rate of extraction.

The amounts of bromin or chlorin and cyanid used will vary according to circumstances; but it has been found that one part of bromin to one thousand parts of ore and from 0.3 to 0.5 parts of cyanid to the same amount of ore have produced very satisfactory results.

In the treatment of refractory concentrates containing as much as fifty-eight per cent. of pyrites and also in the treatment of tellurids and sulfo-tellurids where any of the hitherto known processes have failed it has been possible by this process to extract in five to seven hours from eighty to ninety-eight per cent. of the gold contents, including the whole of the free gold.

In some cases a previous wash of alkaline water may be employed according to the acidity of the ore or for the removal of carbonates, which operation may take place in any convenient vessel. Steam or hot air may be injected at the same time if a warm wash is required. After the ore has undergone the preliminary wash (when it is required) it is transferred to an air-tight vessel containing the cyanid or cyanogen evolving compound solution, through which the oxidizing mixture is blown. The proportion of solution to that of the ore is generally equal weights; but this may be modified according to the kind of ore under treatment.

The gaseous oxidizing or oxidizing and solvent mixtures may be prepared and formed outside the air-tight vessel in any convenient manner.

A complete operation takes between five and seven hours in the generality of cases. In this time complete dissolution of the precious metals takes place. The pulp is then filtered, the separated solution being suitably treated to recover the precious metals.

The pressure within the apparatus is usually about one inch of mercury. This can be increased, if required.

In some instances it may be useful, chiefly in cold climates, to work the solutions and gaseous mixtures at a higher temperature. In this case the air may be suitably warmed and also the gaseous mixtures in the generator and extractor.

The gases issuing from the air-tight vessel will be condensed in a suitable apparatus.

It may be here remarked that no claim is made for the use of halogens in the process of extracting precious metals from their ores, except so far as this use forms part of the present process.

What I claim as my invention, and desire to secure by Letters Patent, is—

1. The within-described process for extracting precious metals from their ores, which consists in agitating the crushed ore in a solvent solution, and blowing through the same a gaseous halogen compound and an acid compound diluted with oxygen in convenient form and constituting an oxidizing agent, and recovering the metals from the solvent in any well-known manner.

2. The within-described process for extracting precious metals from their ores, consisting in first moistening the crushed ore with an alkaline solution and afterward agitating it in a solvent solution and blowing through it an oxidizing agent composed of gaseous bromin and its acid and oxyacid compounds dissolved in air and finally recovering the metals from the solvent in any well-known manner.

In testimony whereof I have signed my name to this specification in the presence of two subscribing witnesses.

JOSÉ BAXERES DE ALZUGARAY.

Witnesses:
ALFRED S. BISHOP,
WALTER J. SKERTEN.